United States Patent
Ku et al.

(10) Patent No.: US 8,885,637 B2
(45) Date of Patent: *Nov. 11, 2014

(54) TECHNIQUES FOR PROVIDING MULTIMEDIA COMMUNICATION SERVICES TO A SUBSCRIBER

(71) Applicant: AT&T Intellectual Property I, LP, Atlanta, GA (US)

(72) Inventors: Bernard Ku, Austin, TX (US); Mehrad Yasrebi, Austin, TX (US); James Jackson, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/767,227

(22) Filed: Feb. 14, 2013

(65) Prior Publication Data
US 2013/0177012 A1    Jul. 11, 2013

Related U.S. Application Data

(63) Continuation of application No. 11/761,468, filed on Jun. 12, 2007, now Pat. No. 8,406,400.

(51) Int. Cl.
| | |
|---|---|
| H04L 12/66 | (2006.01) |
| H04L 29/06 | (2006.01) |
| H04M 7/00 | (2006.01) |
| H04M 3/42 | (2006.01) |

(52) U.S. Cl.
CPC ......... *H04L 29/06326* (2013.01); *H04L 65/40* (2013.01); *H04M 7/0024* (2013.01); *H04M 3/4211* (2013.01); *H04L 65/1069* (2013.01)
USPC ..................................................... 370/352

(58) Field of Classification Search
None
See application file for complete search history.

(56) References Cited

U.S. PATENT DOCUMENTS

| | | | |
|---|---|---|---|
| 5,712,901 A | 1/1998 | Meermans | |
| 6,002,948 A | 12/1999 | Renko | |
| 6,317,607 B1 | 11/2001 | Tomcik | |
| 2001/0034771 A1* | 10/2001 | Hutsch et al. | 709/217 |
| 2003/0028621 A1 | 2/2003 | Furlong | |
| 2004/0028206 A1* | 2/2004 | Freyman et al. | 379/219 |
| 2005/0226223 A1 | 10/2005 | Kaizawa | |
| 2007/0121879 A1 | 5/2007 | McGary | |
| 2010/0217856 A1* | 8/2010 | Falkena | 709/223 |

* cited by examiner

*Primary Examiner* — Otis L Thompson, Jr.
(74) *Attorney, Agent, or Firm* — Guntin & Gust, PLC; Douglas Schnabel

(57) ABSTRACT

A technique for providing multimedia communication services to a subscriber includes receiving a communication query for the subscriber, the communication query having an associated requested communication mode. The technique also includes servicing the communication query for the subscriber using the requested communication mode when the requested communication mode corresponds to one of one or more selected communication modes.

20 Claims, 3 Drawing Sheets

TECHNIQUES FOR PROVIDING MULTIMEDIA COMMUNICATION SERVICES TO A SUBSCRIBER

CROSS-REFERENCE TO RELATED APPLICATIONS

This application is a continuation of U.S. patent application Ser. No. 11/761,468 filed Jun. 12, 2007 which is incorporated herein by reference in its entirety.

FIELD OF THE DISCLOSURE

The present disclosure is generally directed to multimedia communication services and, more particularly, to techniques for providing multimedia communication services to a subscriber.

BACKGROUND OF THE DISCLOSURE

In general, an Internet protocol multimedia subsystem (IMS) provides a framework for delivering Internet protocol (IP) multimedia communication services to wireless and wireline subscriber terminals. A typical IMS network employs an IP-based protocol (e.g., session initiation protocol (SIP)) to facilitate integration with the Internet. In general, an IMS network facilitates access of multimedia and voice applications across wireless and wireline subscriber terminals. IMS employs a horizontal control layer that isolates an access network from a service layer. Alternative and overlapping technologies for providing access and provisioning of services across wired and wireless networks generally include some combination of a generic access network, softswitches, and some variation of SIP. In a typical implementation, an IMS network includes a collection of different functions that are linked by standardized interfaces. A subscriber can connect to an IMS network using various methods that employ a standard IP.

Subscriber terminals, such as mobile telephones, personal digital assistants (PDAs), and computers, can normally register directly into an IMS network, even when the subscriber terminals are roaming in another network. Typically, the only requirement is that a subscriber terminal use Ipv4 (or Ipv6) and run SIP user agents. An IMS network may typically support fixed access (e.g., digital subscriber line (DSL), cable modems, Ethernet, etc.), mobile access (wideband code division multiple access (W-CDMA), CDMA2000, global system for mobile communications (GSM), general packet radio service (GPRS), etc.), and wireless access (wireless local area network (WLAN), worldwide interoperability for microwave access (WiMAX), etc.). IMS networks usually support other telephone systems, such as plain old telephone service (POTS), H.323, and IMS incompatible voice over IP (VoIP) systems, through gateways.

A typical IMS network includes a home subscriber server (HSS) that implements a subscriber database, which supports IMS network entities that handle calls/sessions. The HSS typically maintains subscription-related information (e.g., subscriber profiles), performs authentication and authorization, and can provide information about a physical location of a subscriber. An IMS network also usually includes a subscriber location function (SLF) that is used to map subscriber addresses when multiple HSSs are used. Typically, HSSs and the SLFs communicate using a standard protocol, e.g., a Diameter protocol. An IMS network usually implements private and public subscriber identities, known as an IP multimedia private identity (IMPI) and an IP multimedia public identity (IMPU). The IMPI and the IMPU are uniform resource identifiers (URIs) that can be digits (e.g., the telephone URI tel:+1-512-123-4567) or alphanumeric identifiers (e.g., the SIP URI sip:jane.doe@example.com). An IMPI is unique to a subscriber terminal (e.g., a telephone), which may have multiple IMPUs (e.g., a telephone URI and an SIP URI) per IMPI. An IMPU can be shared between telephones, so both telephones can be reached with the same identity (e.g., a single telephone number for an entire family).

An IMS network may implement multiple SIP servers, which may be collectively referred to as call session control functions (CSCFs). The CSCFs are used to process SIP signaling packets. A proxy CSCF (P-CSCF) is usually an SIP server that is the first point of contact for a subscriber terminal The proxy-CSCF can be located either in a visited network (in full IMS networks) or in a home network (when the visited network is not IMS compliant). Some IMS networks may implement a session border controller (SBC) to implement the functionality of the P-CSCF. In a typical implementation, a subscriber terminal discovers a P-CSCF with a dynamic host configuration protocol (DHCP), or is assigned to a P-CSCF during registration. The P-CSCF may inspect every message from/to a subscriber terminal and usually authenticates and establishes a security association with a subscriber terminal to prevent spoofing and replay attacks and to protect the privacy of a subscriber. In a typical implementation, other nodes of the IMS network trust the P-CSCF and, as such, do not have to re-authenticate the subscriber terminal. The P-CSCF may also compress and decompress SIP messages to reduce utilized bandwidth over communication links.

A P-CSCF may also employ a policy decision function (PDF) that authorizes media plane resources, e.g., quality of service over the media plane for policy control, bandwidth management, etc. In a typical IMS network, one or more serving-CSCFs (S-CSCFs) are employed as a central node in the signaling plane. The S-CSCF normally functions as an SIP server and also performs session control. The S-CSCF is usually always located in the home network. The S-CSCF may employ Diameter Cx and Dx interfaces to the HSS to download and upload user profiles and usually handles SIP registrations, which allows the S-CSCF to bind to the subscriber location (e.g., the IP address of the subscriber terminal) and the SIP address. The S-CSCF may inspect all signaling messages and is usually configured to decide to which application server(s) an SIP message will be forwarded. The S-CSCF typically provides routing services (e.g., telephone number mapping (ENUM) look-ups) and can enforce policies of a network operator. In a typical IMS network, multiple S-CSCFs may be employed for load distribution and availability. Usually, in an IMS network, an HSS assigns the S-CSCF to a subscriber terminal when it is queried by an interrogating-CSCF (I-CSCF).

An I-CSCF is an SIP function that is located at the edge of an administrative domain. An IP address of an I-CSCF is maintained (e.g., using naming authority pointer (NAPTR) types of DNS records) in a domain name system (DNS) of the administrative domain. In this manner, remote servers can locate an I-CSCF and use the I-CSCF as a forwarding point for SIP packets to the administrative domain. The I-CSCF usually queries the HSS using the Diameter Cx interface to retrieve the subscriber location (Dx interface is typically used from I-CSCF to SLF to locate the appropriate HSS) and then routes the SIP request to an assigned S-CSCF. The entry point function may be removed from the I-CSCF and included within an interconnection border control function (IBCF), which may provide a gateway to external networks, and provide network address translation (NAT) and firewall functions.

In an IMS network, application servers (ASs) host and execute services and interface with the S-CSCF using, for example, SIP. Depending on the service provided by an AS, the AS may operate in SIP proxy mode, SIP user agent mode, or SIP back-to-back user agent (B2BUA) mode. An AS may be located in a home network or in an external third-party network. If located in the home network, an AS can query the HSS using a Diameter interface (for an SIP AS) or a mobile application part (MAP) interface (for an IP multimedia service switching function (SSF)).

An IMS network also typically includes one or more media servers, which implement media resource functions (MRFs). An MRF is designed to provide a source of media in a home network. For example a media server may: play audio/video announcements; facilitate multimedia conferencing by, for example, mixing audio streams; perform text-to-speech conversion and speech recognition; and perform real-time transcoding of multimedia data (e.g., conversion between different codecs). MRFs may be further divided into a media resource function control (MRFC) and a media resource function processor (MRFP). The MRFC usually functions as a signaling plane node that acts as an SIP user agent to the S-CSCF and may control the MRFP via, for example, a H.248 interface. The MRFP usually functions as a media plane node that implements all media-related functions.

An IMS network may also include one or more breakout gateways (BGs). A BG provides a breakout gateway control function (BGCF), which functions as an SIP server that performs routing functionality, based on telephone numbers. The BGCF is usually only used when calling from the IMS network to a telephone in a circuit switched (CS) network, such as a public switched telephone network (PSTN) or a public land mobile network (PLMN). A PSTN gateway interfaces the IMS network with a PSTN network. For signaling, CS networks typically use integrated services digital network (ISDN) user part (ISUP) over message transfer part (MTP), while IMS uses SIP. For media, CS networks typically use pulse code modulation (PCM), while IMS uses a real-time transport protocol (RTP). A signaling gateway (SGW) in the IMS network may be implemented to interface with a signaling plane of a CS network to transform a stream control transmission protocol (SCTP) (which is an Internet protocol) into a MTP (which is a signaling system 7 (SS7) protocol) to pass ISUP from a media gateway control function (MGCF) to the CS network. The MGCF usually does call control protocol conversion between SIP and ISUP and interfaces with the SGW over SCTP. The MGCF may also control resources in the media gateway (MGW), via an H.248 interface. The MGW interfaces with the media plane of the CS network and converts between RTP and PCM. The MGW may also transcode when codecs do not match.

An ENUM database may be used, for example, in conjunction with a DNS database to resolve Internet namespaces for voice over Internet protocol (VoIP) subscriber terminals. More broadly, an ENUM database may be used to map a dialed telephone number to an SIP/telephone uniform resource identifier (URI), an email address URI, an instant messaging (IM) URI (for presence or chat), a website address, etc. In an IMS network, an ENUM server may implement a combined ENUM/DNS database and, in this case, essentially function as a DNS server. In a typical IMS implementation, a S-CSCF that is serving a calling party queries an ENUM server to resolve a called party E.164 international telephone number to an SIP URI for a VoIP subscriber terminal of a called party. As mentioned above, an HSS stores detailed information about a subscriber and a name/address of a S-CSCF to which each subscriber terminal is registered (and served by). When a VoIP subscriber terminal is turned on, the terminal automatically looks for a serving IMS network and tries to connect to a P-CSCF. The VoIP subscriber terminal then sends out an SIP register message to the HSS to become a registered VoIP subscriber terminal When a subscriber using a VoIP subscriber terminal places a call, a call signal (SIP invite message) first reaches a S-CSCF to which the terminal has registered (which is known as the originating S-CSCF). The originating S-CSCF then queries an ENUM server in an attempt to convert a called party E.164 international telephone number into an SIP URI for the called party terminal. The originating S-CSCF then forwards the call signal (SIP invite) to an interrogating-CSCF (I-CSCF), which forwards the call signal to a terminating S-CSCF. The terminating S-CSCF forwards the call signal to the subscriber terminal of the called party to set up the end-to-end call path between the calling and called parties.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION OF THE DRAWINGS

Figure 1:
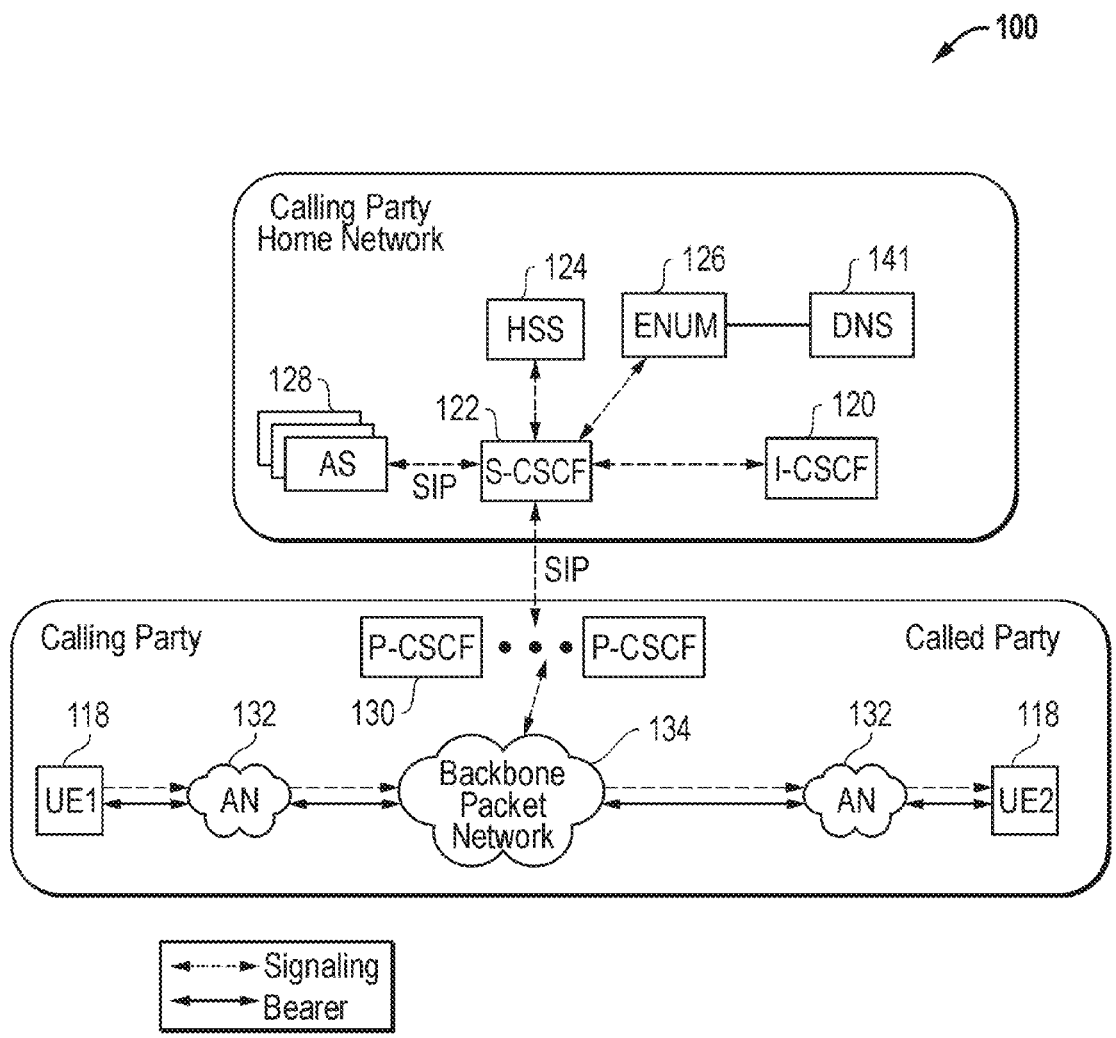
FIG. 1 shows an electrical block diagram of an example Internet protocol multimedia subsystem (IMS) that may be configured according to an embodiment of the present disclosure.

According to one aspect of the present disclosure, a telephone number mapping (ENUM) system is enhanced to provide preferred multimedia communication services to a subscriber, e.g., a person with a disability. As is well know, a traditional ENUM system is implemented through a suite of protocols that unify the E.164 international telephone number system with the Internet domain name system (DNS) by employing an indirect look-up method to obtain naming authority pointer (NAPTR) records, which are usually stored at a DNS database. While the discussion herein focuses on an ENUM system as a component of Internet protocol multimedia subsystem (IMS) network, it is contemplated that the techniques disclosed herein are broadly applicable to other networks. According to various aspects of the present disclosure, techniques are described that provide a dynamic mechanism for providing enhanced multimedia communication services to subscribers. The techniques may be, for example, advantageously employed for a subscriber that has a temporary or permanent disability, e.g., a hearing, speaking, seeing, or upper extremity (arm/hand) disability.

In general, the techniques disclosed herein provide an optimized solution for a subscriber with one or more disabilities and enhance a satisfaction level of the subscriber (customer). Moreover, the techniques disclosed herein improve the efficiency of provisioning tailored communication services and enhance the flexibility of IMS to reduce unnecessary traffic delays and call flows at run-time, e.g., by not accessing an IMS Presence Server when a selected communication service indicates that the presence of a subscriber is not required. As is known, an IMS Presence Server is capable of determining whether a particular subscriber is currently able and willing to engage in certain communications (e.g., IM) on an IMS network. While the techniques disclosed herein are particularly advantageous when employed for subscribers with long-term disabilities, the techniques may also benefit subscribers with short-term disabilities, e.g., subscribers with temporary limited eyesight or hearing due to sickness or accident, or subscribers without disabilities.

According to one aspect of the present disclosure, a technique for providing multimedia communication services to a subscriber includes receiving a communication query, which has an associated requested communication mode, for the subscriber. The technique also includes servicing the communication query for the subscriber using the requested communication mode, when the requested communication mode corresponds to one of one or more subscriber selected communication modes.

According to another aspect of the present disclosure, a system for providing multimedia communication services to a subscriber includes a subscriber terminal and a first server. The first server is configured to communicate with the subscriber terminal and is configured to receive a communication query, which has an associated requested communication mode, for the subscriber terminal. The first server is also configured to service the communication query for the subscriber terminal using the requested communication mode, when the requested communication mode corresponds to one of one or more subscriber selected communication modes.

According to a different aspect of the present disclosure, a technique for providing multimedia communication services to a subscriber includes receiving, at a home subscriber server or an application server, a communication mode selection for a subscriber. The communication mode selection specifies subscriber selected communication modes for the subscriber. The technique also includes modifying, based on the communication mode selection, one or more naming authority pointer records associated with the subscriber. The one or more naming authority pointer records, which are stored at a telephone number mapping server, correspond to the subscriber selected communication modes for the subscriber. The technique further includes receiving a communication query, which has an associated requested communication mode, for the subscriber. Finally, the technique includes servicing the communication query for the subscriber using the requested communication mode, when the requested communication mode corresponds to one of the subscriber selected communication modes.

FIG. 1 shows a relevant portion of an example Internet protocol (IP) multimedia subsystem (IMS) network 100 that includes multiple proxy call session control functions (P-CSCFs) 130, an interrogating CSCF (I-CSCF) 120, a serving CSCF (S-CSCF) 122, a home subscriber server (HSS) 124, a telephone number mapping (ENUM) server 126, a domain name system (DNS) server 141, multiple application servers (ASs) 128, multiple access networks (ANs) 132, a backbone packet network 134, and multiple user equipment (UE) devices (or subscriber terminals) 118, denoted as UE1 and UE2. The subscriber terminals 118 may be configured to connect to other circuit-switched or packet-switched networks (not shown). Signaling and bearer activities are depicted by dashed and solid lines, respectively, between the subscriber terminals 118, denoted as UE1 and UE2.

The ENUM server 126 resolves E.164 international telephone numbers to one or more uniform resource identifiers (URIs) and may provide other DNS related services. Typically, naming authority pointer (NAPTR) records are used for translating E.164 addresses to other addresses, e.g., SIP addresses. The P-CSCFs 130 may act as session initiation protocol (SIP) proxies that serve as a first point of contact to the subscriber terminals 118. The I-CSCF 120 is an SIP proxy that can, among other functions, query the HSS 124 to retrieve locations for the subscriber terminals 118 and route SIP calls to the S-CSCF 122. The S-CSCF 122 usually functions as an SIP server that can handle SIP registrations, which allows the subscriber terminals 118 to be bound to a location. The S-CSCF 122 can also decide which particular one of the ASs 128 to forward an SIP message to in order to provide a subscriber desired service. For example, one of the ASs 128 may function as an IMS Presence Server. The ASs 128 can also provide routing services using ENUM look-ups, and can enforce the policy of an operator of the IMS network 100. The ASs 128 may also host and execute value-added IMS services (e.g., caller identification (ID), call waiting, push-to-talk, etc.).

According to various aspects of the present disclosure, a straight forward process of provisioning enhanced ENUM system services may be employed. For example, a subscriber (or a proxy acting on behalf of the subscriber) may sign-up for the enhanced ENUM system services using a web browser, an interactive voice response (IVR) system, etc., via the HSS 124, which is in communication with the ENUM server 126. As one example, a blind subscriber (or a proxy for the blind subscriber) may select a voice-only communication mode for a dual-mode (cellular and WiFi enabled) handset and reject incoming text messages and instant messaging (IM) chat sessions. As another example, a deaf and dumb subscriber may select email and IM chat session communication modes and reject incoming voice calls. As yet another example, a subscriber who recently broke both arms in an accident may temporarily select a voice-only communication mode. In this case, all incoming text messages and IM chat sessions are rejected during a selected recovery period. In one embodiment, a subscriber may register their personal profile (including selected communication modes) when the subscriber (or a proxy acting on behalf of the subscriber) accesses a home subscriber server (HSS). Alternatively, a subscriber may register one or more selected communication modes via one of the ASs 128.

After registration, the HSS 124 or one of the ASs 128 may send instructions to the ENUM server 126 to modify a selected naming authority pointer (NAPTR) record or records. As is well known, a NAPTR record is a type of domain name system (DNS) record that supports regular expression (RE) based rewriting. In this case, several NAPTR records may be chained together to create relatively sophisticated rewriting rules. It should be appreciated that a record may go through a number of rewrites. For example, the telephone number +1-512-555-1212 may be translated into the URI 2.1.2.1.5.5.5.2.1.5.1.e164.arpa as described by E.164, which defines the international public telecommunication numbering plan used in the PSTN and some other data networks. A dynamic delegation discovery system (DDDS) may then be employed to transform the URI using rewrite rules gathered from NAPTR records. For example, a Berkley Internet name domain (BIND) configuration for the records returned from a query for the URI 2.1.2.1.5.5.5.2.1.5.1.e164.arpa may be provided as follows:
TABLE-US-00001                            $ORIGIN 2.1.2.1.5.5.5.2.1.5.1.e164.arpa. IN NAPTR 100 10 "u"

"E2U+sip" "! {circumflex over ( )}.*$!sip: information@pbx.example.com!". IN NAPTR 102 10 "u" "E2U+email" "! {circumflex over ( )}.*$!mailto: information@example.com!".

In the two URIs above, the first record has an order value of 100 which is lower than 102 and, as such, is picked first. In this case, the preference of 10 is ignored as no other rules have an order of 100. The "u" signifies a terminal rule in ENUM and URI applications, such that the output of the rewrite is the desired answer. If the service designated with the key "sip+ E2U" is supported, other rules with higher-order values are not investigated. The regular expression (RE) "!.*$!sip: information@pbx.example.com!" is used to transform the original query of 2.1.2.1.5.5.5.2.1.5.1.e164.arpa into sip: information@pbx.example.com. In the RE, the exclamation mark '!' is a delimiter and the sequence "A.*$" indicates the start of the RE. In the example above, if SIP is not supported, "mailto:information@example.com" may be utilized as a fall-back.

According to various aspects of the present disclosure, a permanently blind subscriber with a hand disability may, for example, select to turn-off all email/IM uniform resource indicators (URIs) and turn-on a session initiation protocol (SIP)/telephone URIs. As another example, a permanently deaf subscriber may select to turn-off all SIP/telephone URIs and turn-on email/IM URIs. In this case, when caller wants to reach the disabled person, only the preferred URIs are returned in response to the ENUM/DNS queries. A subscriber (or a proxy of the subscriber) with a short-term disability may also register on the HSS 124 or one of the ASs 128. In this case, the HSS 124 or one of the ASs 128 sends program instructions to modify the provisioning NAPTR in the ENUM server 126 for a certain time period. For example, if the subscriber is temporarily blind and has a temporary hand disability, email/IM URIs may be turned off for a specified period and an SIP/telephone URIs may be turned on. As another example, when a subscriber is temporarily deaf, all SIP/telephone URIs may be turned off and email/IM URIs may be turned on for a specified period. When a caller wants to reach the disabled person during the specified time period, only the preferred URIs are returned in response to ENUM/ DNS queries. After the specified period, all the URIs are turned on and activated in the NAPTR record.

Figure 2:
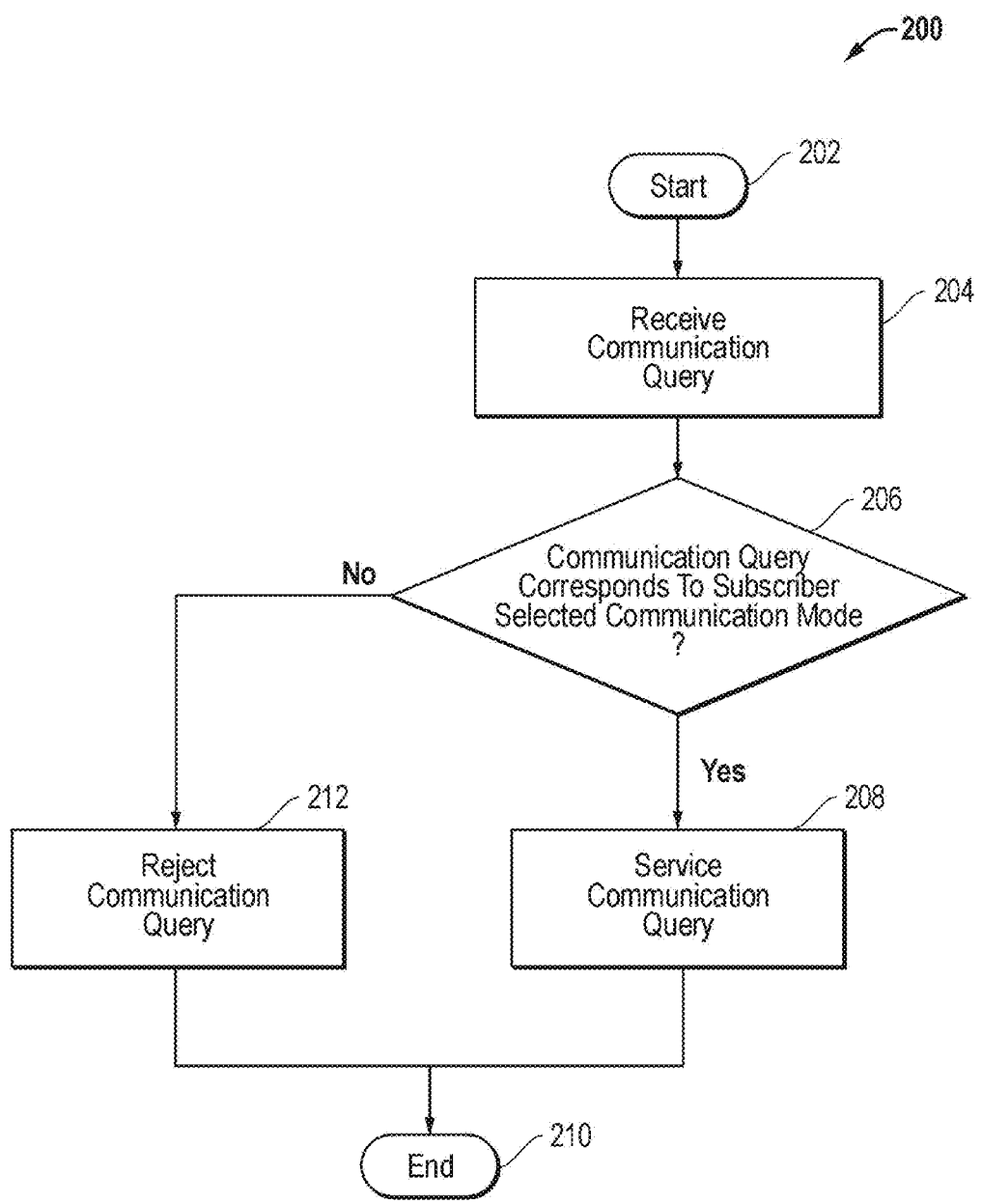
FIG. 2 shows a flow chart of an example communication query process for providing multimedia communication services to a subscriber.

FIG. 2 shows an example communication query process 200 that is implemented according to one aspect of the present disclosure. The process 200 is initiated in block 202, at which point control transfers to block 204, where a communication query is received at a server, e.g., one of the ASs 128. Next, in decision block 206, the server determines whether the communication query corresponds to a subscriber selected communication mode by, for example, accessing the ENUM server 126 and retrieving one or more NAPTR records for an associated subscriber. If the communication query corresponds to a subscriber selected communication mode, control transfers from block 206 to block 208, where the communication query is serviced. Following block 208, control transfers to block 210, where the process 200 terminates. On the other hand, if the communication query does not correspond to a subscriber selected communication mode, control transfers from block 206 to block 212, where the communication query is rejected. Next, control transfers from block 212 to block 210.

Figure 3:
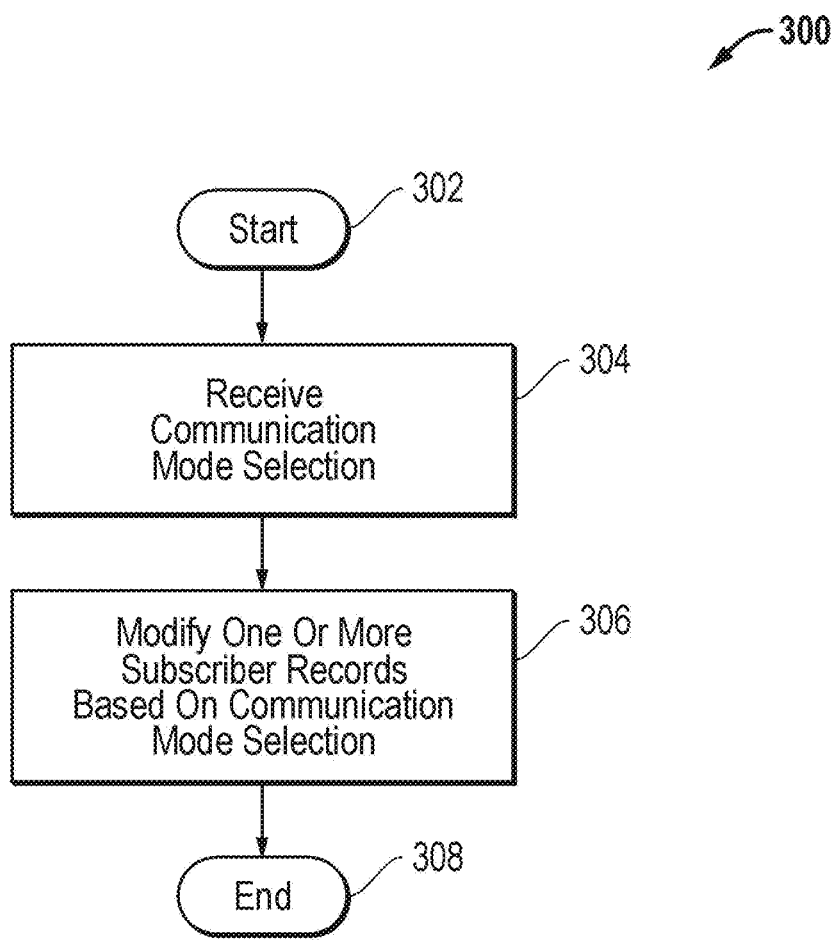
FIG. 3 shows a flow chart of an example communication mode selection process.

FIG. 3 shows an example communication mode selection process 300. In block 302, the process 300 is initiated, at which point control transfers to block 304. In block 304, a communication mode selection is received from a subscriber. For example, a subscriber utilizing a subscriber terminal 118, e.g., a personal computer, a mobile telephone, or a personal digital assistant (PD), may communicate with one of the ASs 128 or the HSS 124 to register one or more selected communication modes. Next, in block 306, one of the ASs 128 or the HSS 124 may cause one or more NAPTR records stored at the ENUM server 126 or the DNS 141 to be modified to reflect a preferred communication mode for the subscriber. From block 306, control transfers to block 308, where the process 300 terminates.

As a specific example, a blind subscriber named John may select voice as the preferred communication mode for his dual-mode handset, whose assigned telephone number is 1-512-372-5111. In this case, John selects to reject all incoming text messages and IM chat sessions and allow only SIP/ telephone URIs, which may be implemented as follows:
TABLE-US-00002 $ORIGIN 1.1.1.5.2.7.3.2.1.5.1.e164.arpa. IN NAPTR 100 10 "u" "E2U+sip" "!{circumflex over ( )}.*$!sip:john@sip-proxy.org!". IN NAPTR 100 20 "u" "E2U+tel" "!{circumflex over ( )}.*$!tel:+15123725111!".

As another specific example, a deaf and dumb subscriber named Mary may select emails and IM chat sessions as her preferred communication modes. In this case, Mary rejects all incoming voice calls and allows only text messaging/IM chat sessions or email, which may be implemented as follows:
TABLE-US-00003 $ORIGIN 2.2.2.5.2.7.3.2. 1.5.1.e164.arpa. IN NAPTR 100 10 "u" "E2U+mailto" "!{circumflex over ( )}.*$!mailto: mary@company.com!". IN NAPTR 100 20 "u" "E2U+im" "!{circumflex over ( )}.*$!im: mary@company.com!".

As yet another example, a subscriber named Jack broke both his arms and hands in a recent accident and, as such, selects voice calls as his preferred communication mode. In this case, Jack rejects all incoming text messages/IM chat sessions and emails and allows only SIP/telephone URIs during a recovery period, which may be implemented as follows:
TABLE-US-00004 $ORIGIN 3.3.3.5.2.7.3.2.1. 5.1.e164.arpa.IN NAPTR 100 10 "u" "E2U+sip" "! {circumflex over ( )}.*$!sip:jack@sip-proxy.org!". IN NAPTR 100 20 "u" "E2U+tel" "! {circumflex over ( )}.*$!tel:+ 15123723333!". IN NAPTR 100 30 "u" "E2U+mailto" "! {circumflex over ( )}.*$!mailto: jack@company. com!".disabled till Aug. 15, 2007 IN NAPTR 100 40 "u" "E2U+im" "!{circumflex over ( )}.*$!im: jack@company. com!".disabled till Aug. 15, 2007

In the above case, Jack cannot edit or type and, as such, email and IM requests are disabled until Aug. 15, 2007. The expiration date may be implemented as an extra field that is added in an ENUM NAPTR record and may be checked by service logic to determine if the expiration date falls within valid dates. During the period in which an ENUM NAPTR record is disabled, the service logic refrains from sending the disabled ENUM NAPTR record to an S-CSCF, which performs routing to email addresses and IM URIs. In the examples set forth above, a dynamic mechanism for providing preferred and optimized multimedia services to a subscriber, e.g., a person with one or more permanent or temporary disabilities, has been described that enriches a quality of life of the subscriber while at the same time increasing satisfaction of the subscriber with the services provided.

Accordingly, techniques have been disclosed herein that provide improved multimedia communication services to a subscriber. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. .sctn. 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, by a system comprising a processor, a configuration request from an application server of a communication network to disable a first communication mode of a subscriber device for a first time period;
   modifying, by the system, a first address pointer associated with the first communication mode of a subscriber device at a telephone number mapping server (ENUM server) of the communication network according to the configuration request, wherein the first address pointer is a naming authority pointer record that is stored at the telephone number mapping server;
   receiving, by the system, a communication query from a network element of the communication network to access the subscriber device by a requested communication mode at a requested time period;
   retrieving, by the system, an address pointer from the telephone number mapping server corresponding to the subscriber device and the requested communication mode to identify a retrieved address pointer;
   determining, by the system, whether the retrieved address pointer indicates that the requested communication mode is disabled for the subscriber device for the requested time period;
   transmitting, by the system, from the communication network a rejection of the communication query responsive to determining that the retrieved address pointer is disabled for the request time period;
   detecting, by the system, a mismatch between the requested communication mode and the first communication mode; and
   servicing, by the system, at the communication network the communication query for the subscriber device using the requested communication mode responsive to detecting the mismatch between the requested communication mode and the first communication mode.

2. The method of claim 1, wherein the configuration request originates at a subscriber device.

3. The method of claim 2, wherein the subscriber device generates the configuration request via an interactive voice response system.

4. The method of claim 1, wherein the configuration request originates at a home subscriber server.

5. The method of claim 4, wherein the home subscriber server generates the configuration request from a web browser.

6. The method of claim 1, wherein the first communication mode corresponds to a voice communication mode.

7. The method of claim 1, wherein the first communication mode corresponds to one of a text messaging communication mode, an instant messaging communication mode, or an email communication mode.

8. The method of claim 1, wherein the configuration request is generated according to a personal profile of a subscriber associated with the subscriber device.

9. A server device, comprising:
a memory to store computer instructions; and
a processor coupled to the memory, wherein responsive to executing the computer instructions, the processor performs operations comprising:
receiving a configuration request from an application server of a communication network to disable a first communication mode of a subscriber device for a first time period;
modifying a first address pointer associated with the first communication mode of the subscriber device at a telephone number mapping server (ENUM server) of the communication network according to the configuration request, wherein the first address pointer is a naming authority pointer record that is stored at the telephone number mapping server;
receiving a communication query from a network element of the communication network to access the subscriber device by a requested communication mode at a requested time period;
retrieving an address pointer from the telephone number mapping server corresponding to the subscriber device and the requested communication mode to identify a retrieved address pointer;
determining whether the retrieved address pointer indicates that the requested communication mode is disabled for the subscriber device for the requested time period;
transmitting from the communication network a rejection of the communication query responsive to determining that the retrieved address pointer is disabled for the request time period;
detecting a mismatch between the requested communication mode and the first communication mode; and
servicing at the communication network the communication query for the subscriber device using the requested communication mode responsive to detecting the mismatch between the requested communication mode and the first communication mode.

10. The server device of claim 9, wherein the configuration request originates at a subscriber device.

11. The server device of claim 9, wherein the configuration request is generated according to a personal profile of a subscriber associated with the subscriber device.

12. The server device of claim 9, wherein the configuration request originates at a home subscriber server.

13. The server device of claim 12, wherein the home subscriber server generates the configuration request from a web browser.

14. The server device of claim 9, wherein the first communication mode corresponds to a voice mode.

15. The server device of claim 14, wherein the voice mode includes one of a session initiation protocol voice over Internet protocol mode or a voice telephone mode.

16. The server device of claim 9, wherein the first communication mode corresponds to one of a text messaging mode, an instant messaging mode, or an email mode.

17. A non-transitory computer-readable medium including processor-readable instructions, which when executed by a processor cause the processor to:
receiving a configuration request from an application server of a communication network to disable a first communication mode of a subscriber device for a first time period;
modifying a first address pointer associated with the first communication mode of the subscriber device at a telephone number mapping server (ENUM server) of the communication network according to the configuration request, wherein the first address pointer is a naming authority pointer record that is stored at the telephone number mapping server;
receiving a communication query from a network element of the communication network to access the subscriber device by a requested communication mode at a requested time period;
retrieving an address pointer from the telephone number mapping server corresponding to the subscriber device and the requested communication mode to identify a retrieved address pointer;
determining whether the retrieved address pointer indicates that the requested communication mode is disabled for the subscriber device for the requested time period;
transmitting from the communication network a rejection of the communication query responsive to determining that the retrieved address pointer is disabled for the request time period;
detecting a mismatch between the requested communication mode and the first communication mode; and
servicing at the communication network the communication query for the subscriber device using the requested communication mode responsive to detecting the mismatch between the requested communication mode and the first communication mode.

18. The non-transitory computer-readable medium of claim 17, wherein the configuration request is generated according to a personal profile of a subscriber associated with the subscriber device.

19. The non-transitory computer-readable medium of claim 17, wherein the first communication mode corresponds to a voice communication mode.

20. The non-transitory computer-readable medium of claim 17, wherein the first communication mode corresponds to a text messaging communication mode.

* * * * *